US010282618B2

(12) United States Patent
Costello-Jones et al.

(10) Patent No.: US 10,282,618 B2
(45) Date of Patent: May 7, 2019

(54) MULTI-BLEND FINGERPRINTING

(71) Applicant: Cisco Technology, Inc., San Jose, CA (US)

(72) Inventors: Michael Costello-Jones, Crowthorne (GB); Tony Leigh, Wokingham (GB); James Charles Wilson, Fiddleford (GB)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/465,836

(22) Filed: Mar. 22, 2017

(65) Prior Publication Data
US 2018/0276477 A1 Sep. 27, 2018

(51) Int. Cl.
G06K 9/00 (2006.01)
G06K 9/46 (2006.01)
G06K 9/62 (2006.01)
G06T 1/00 (2006.01)
H04N 21/258 (2011.01)
H04N 21/8358 (2011.01)
H04N 21/234 (2011.01)
H04N 21/254 (2011.01)
H04N 21/44 (2011.01)
H04N 21/4627 (2011.01)

(52) U.S. Cl.
CPC ....... G06K 9/00744 (2013.01); G06K 9/4604 (2013.01); G06K 9/6212 (2013.01); G06T 1/005 (2013.01); H04N 21/23418 (2013.01); H04N 21/2541 (2013.01); H04N 21/25816 (2013.01); H04N 21/25875 (2013.01); H04N 21/44008 (2013.01); H04N 21/4627 (2013.01); H04N 21/8358 (2013.01); G06T 2201/0053 (2013.01); G06T 2201/0065 (2013.01)

(58) Field of Classification Search
None
See application file for complete search history.

(56) References Cited

U.S. PATENT DOCUMENTS

| | | | | |
|---|---|---|---|---|
| 2006/0206429 A1* | 9/2006 | Martinez | ............. | G06Q 99/00 705/50 |
| 2008/0063244 A1* | 3/2008 | Tanaka | ............. | G06K 9/00033 382/115 |
| 2009/0279742 A1* | 11/2009 | Abiko | ............. | G06K 9/00026 382/107 |
| 2010/0322469 A1* | 12/2010 | Sharma | ............. | G06T 1/0028 382/100 |
| 2012/0075452 A1* | 3/2012 | Ferren | ............. | G02B 13/0065 348/78 |
| 2016/0234564 A1* | 8/2016 | Holyoak | ............. | H04N 21/812 |

* cited by examiner

Primary Examiner — Stephen P Coleman
(74) Attorney, Agent, or Firm — Merchant & Gould P.C.

(57) ABSTRACT

Multi-blend fingerprinting may be detected. First, a video sample may be received. Next, frames of the received video sample may be step iteratively through until a probability value corresponding to a current frame indicates a match. Deciding that the probability value indicates the match may comprise creating an augmented frame, determining the probability value corresponding to the created augmented frame, and determining that the probability value indicates the match. Then a fingerprint from the created augmented frame may be extracted.

17 Claims, 5 Drawing Sheets

MULTI-BLEND FINGERPRINTING

TECHNICAL FIELD

The present disclosure relates generally to video fingerprinting.

BACKGROUND

A digital watermark is a marker embedded in a noise-tolerant carrier signal corresponding to audio, video, or image data. The digital watermark may be used to identify ownership of a copyright of content corresponding to the carrier signal. "Watermarking" is the process of hiding digital information (e.g., the watermark) in the carrier signal. The hidden information may or may not contain a relation to the carrier signal. Digital watermarks may be used to verify the authenticity or integrity of the carrier signal or to show the identity of owners of the underlying content. It is used, for example, for tracing copyright infringements and for banknote authentication.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1A:
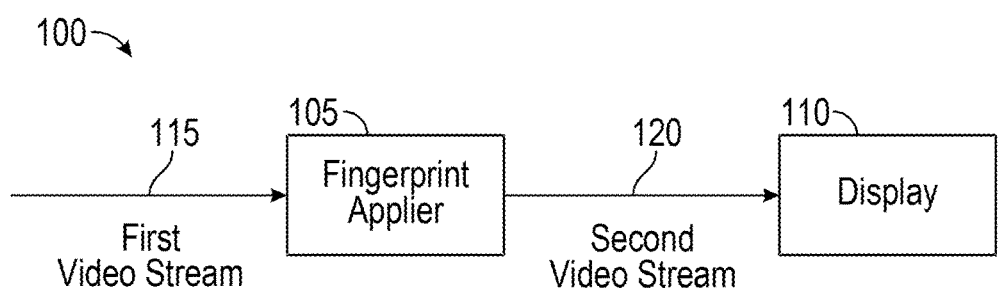
FIG. 1A is a block diagram of a fingerprint applier.

Multi-blend fingerprinting may be detected. First, a video sample may be received. Next, frames of the received video sample may be step iteratively through until a probability value corresponding to a current frame indicates a match. Deciding that the probability value indicates the match may comprise creating an augmented frame, determining the probability value corresponding to the created augmented frame, and determining that the probability value indicates the match. Then a fingerprint from the created augmented frame may be extracted.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Many video based content service providers implement a subscription based model where subscribers pay to receive video based content. Security measures may be used in this subscription based model to ensure subscribers only receive the content they have paid for. As these security measures increase, it has been more attractive for those aiming to breach these security measures (i.e., "pirates") to consider other breaching processes. One such breaching process used by pirates may comprise obtaining a valid subscription from the video based content service provider to receive video based content, but then re-broadcast the received video based content to many other non-paying consumers. This re-broadcasting may be performed over the internet via social media or other sites.

To counter this type of breach, for example, embodiments of the disclosure may implement "fingerprinting" (e.g., blind, source track watermarking). For example, a fingerprint applier or device (e.g., a set top box (STB)) may overlay the video content in a unique way so that should the video be used in an unauthorized manner (i.e., a breach), the subscriber who initiated the breach may be identified and appropriate action taken (e.g., subscription termination). Because the fingerprint applier may not have access to the source video corresponding to the video content, it may be acceptable to overlay pixels in a spatial domain (e.g., a constellation) that may be minimally visible to a viewer of the displayed content. This set of pixels may be unique to each fingerprint applier (e.g., STB) and may comprise the fingerprint. Due to hardware security requirements of the fingerprint applier and its low resource footprint, the fingerprint applier may not access or read pixel information from the source video corresponding to the video content.

Since the video based content service provider may enable the fingerprint overlay on a large number (e.g., potentially an entire subscriber base) of devices (e.g., fingerprint appliers), the pixels constituting the fingerprint may be as discrete as possible so as to not interfere with viewing of content. One form of fingerprinting may be to output a subscriber identifier in text on the displayed video. However, this may be both annoying to the viewer and trivial for the pirate to remove from the re-broadcasted video. Accordingly, there may be a tradeoff between the ease of detection of a fingerprint and its visual perceptibility. In other words, the less obtrusive a fingerprint is to a viewer, the harder it may be to detect. Embodiments of the disclosure may work within the constraints of a low resource fingerprint applier; minimize the fingerprint's perceptibility, while maximizing the fingerprint's detectability.

FIG. 1A is a block diagram of a fingerprint application system 100. As shown in FIG. 1A, fingerprint application system 100 may comprise a fingerprint applier 105 and a display 110. Fingerprint applier 105 may comprise, but is not limited to, a cellular base station, a tablet device, a mobile device, a smart phone, a telephone, a remote control device, a set-top box, a digital video recorder, a cable modem, a personal computer, a network computer, a mainframe, a network switch, a router, or other similar device. Display 110 may comprise any device capable of displaying video such as, but not limited to, a television, a computer display, a tablet device, a mobile device, a smart phone, a personal computer, or any other type device.

Fingerprint applier 105 may receive a first video stream 115 that may correspond to video based content. Fingerprint applier 105 may then apply fingerprinting to the video based content received in first video stream 115 as described in greater detail below with respect to FIG. 2. Fingerprint applier 105 may then supply the fingerprinted version of first video stream 115 as a second video stream 120 to display 110. Display 110 may display the fingerprinted version of first video stream 115 (i.e., second video stream 120). If a user (e.g., a subscriber) produces and pirates (e.g., re-broadcasts) a version of the video based content taken from second video stream 120 or taken as displayed on display 110, this pirated, re-broadcasted version of the video based content may contain the applied fingerprinting.

Figure 1B:
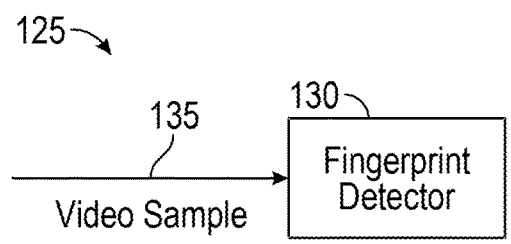
FIG. 1B is a block diagram of a fingerprint detector.

FIG. 1B is a block diagram of a fingerprint detection system 125. As shown in FIG. 1B, fingerprint detection system 125 may comprise a fingerprint detector 130. Fingerprint print detector 130 may comprise, but is not limited to, a cellular base station, a tablet device, a mobile device, a smart phone, a telephone, a remote control device, a set-top box, a digital video recorder, a cable modem, a personal computer, a network computer, a mainframe, a network switch, a router, or other similar device. Fingerprint print detector 130 may be separate from fingerprint applier 105 and may not be accessible to the aforementioned pirate.

Fingerprint detector 130 may receive a video sample 135 that may correspond to a fingerprinted version of the video based content fingerprinted, for example, by the process described below with respect to FIG. 2. Fingerprint detector 130 may then detect and extract a fingerprint from video sample 135 as described in greater detail below with respect to FIG. 4. From the fingerprint, a subscriber may be identified from whose video based content service the video content contained in video sample 135 was taken. In this way, the subscriber who may have initiated a security breach may be identified and appropriate action taken (e.g., subscription termination).

Figure 2:
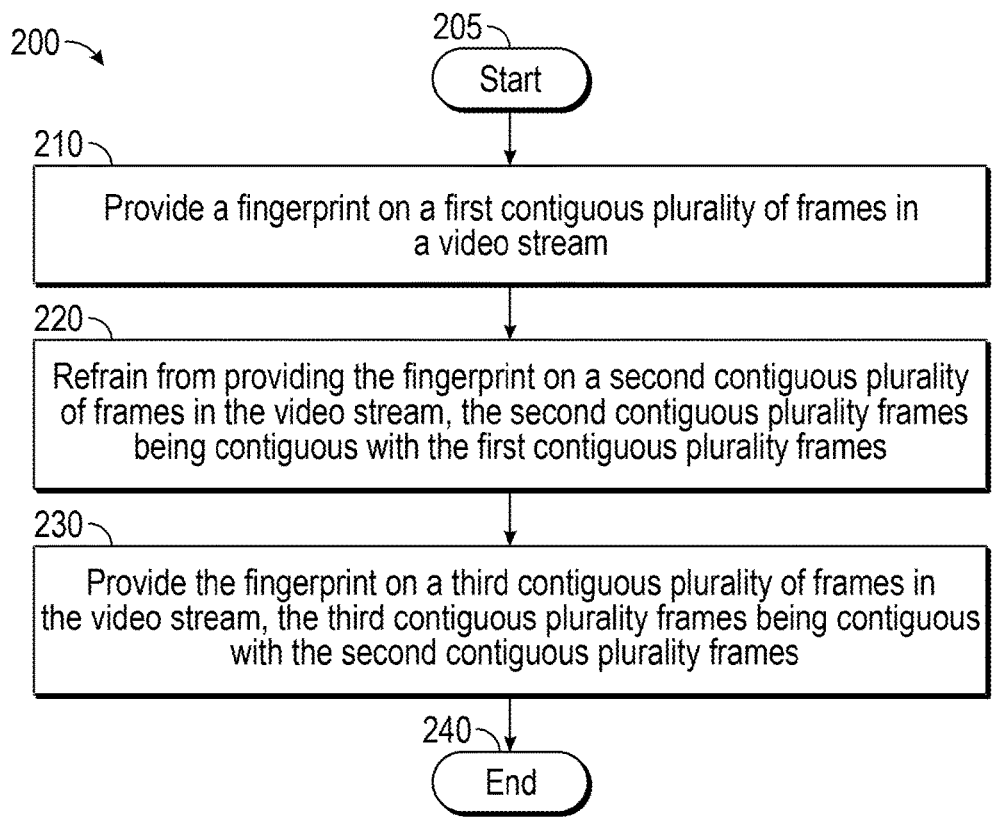
FIG. 2 is a flow chart of a method for providing multi-blend fingerprinting.

FIG. 2 is a flow chart setting forth the general stages involved in a method 200 consistent with embodiments of the disclosure for providing multi-blend fingerprinting. Method 200 may be implemented using fingerprint applier 105 as described in more detail above with respect to FIG. 1A. Ways to implement the stages of method 200 will be described in greater detail below.

Method 200 may begin at starting block 205 and proceed to stage 210 where fingerprint applier 105 may provide a fingerprint on a first contiguous plurality of frames in first video stream 115. For example, the video based content that is to be protected by fingerprinting may be, for example, a live stream or file based content. In either case, a start-time and duration may be defined. A fingerprint may be constructed in the spatial domain. The fingerprint may comprise a set of pixels that may define a constellation drawn onto a video frame for example. However, the fingerprint may be spread over multiple frames of the video based content.

Consistent with embodiments of the disclosure, the fingerprint may comprise a constellation of pixels defined by any geometric elements. For example, the fingerprint may comprise a circle of radii four that may be placed on a 1920×1080 canvas colored with 50% opacity in white. The constellation may be unique to a fingerprint applier (e.g., fingerprint applier 105) that in turn may be associated with a particular subscriber or account with the video based content provider who supplied the video based content corresponding to first video stream 115.

Figure 3:
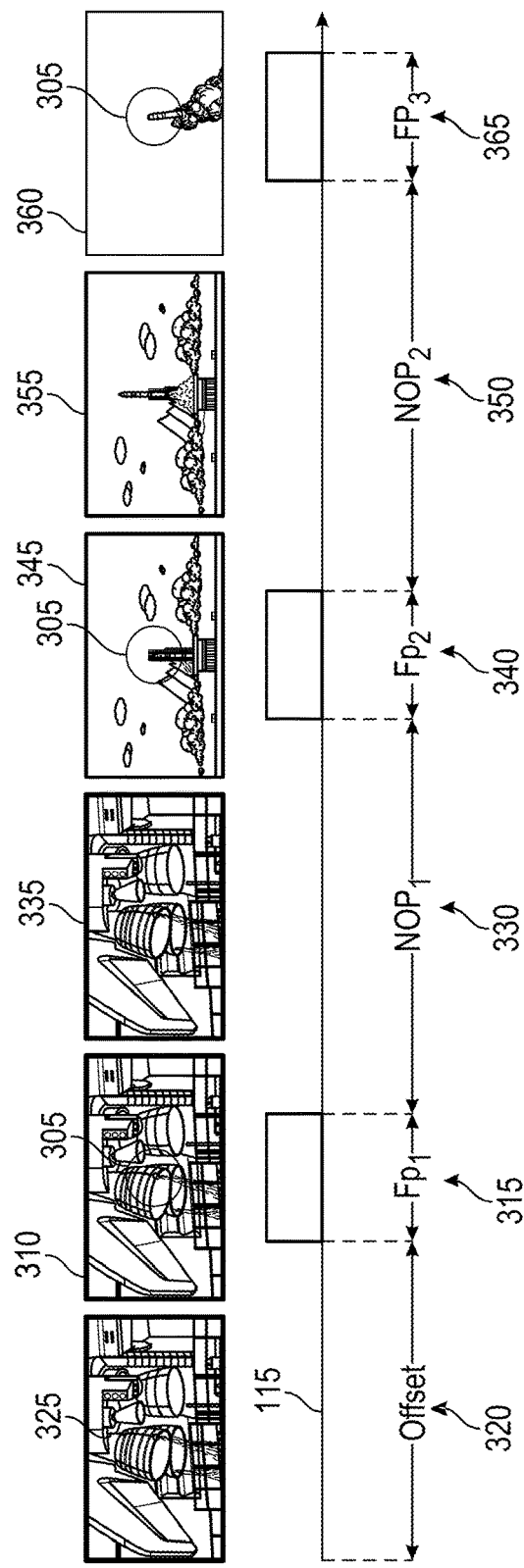
FIG. 3 shows an example of a video stream.

FIG. 3 shows an example of first video stream 115. As shown in FIG. 3, a fingerprint 305 (comprising a circle in this example) may be overlaid onto a set of frames (e.g., the first contiguous plurality of frames) in the video based content (e.g., first video stream 115). Frame 310 may comprise an example frame in the first contiguous plurality of frames. In other words, fingerprint 305 may be overlaid on the first contiguous plurality of frames in first video stream 115. This period (e.g., the first contiguous plurality of frames) of applying fingerprint 305 may comprise a first fingerprint time period 315 and may be defined, for example, in terms of a number of frames (e.g., 12 frames) or in terms of time (e.g., 0.5 seconds of the underlying video).

An offset 320 may or may not occur prior to first fingerprint time period 315 from a start-time of first video stream 115. Frame 325 may comprise an example frame in first video stream 115 during offset 320. The detectability of fingerprint 305 may depend on the underlying video onto which fingerprint 305 is placed.

From stage 210, where fingerprint applier 105 provides fingerprint 305 on the first contiguous plurality of frames in first video stream 115, method 200 may advance to stage 220 where fingerprint applier 105 may refrain from providing fingerprint 305 on a second contiguous plurality of frames in first video stream 115. The second contiguous plurality frames may be contiguous with the first contiguous plurality frames.

Fingerprint applier 105, for example, may refrain from providing fingerprint 305 on the second contiguous plurality of frames in first video stream 115. This period (e.g., the second contiguous plurality of frames) of not applying fingerprint 305 may comprise a first non-operational time period 330 and may be defined, for example, in terms of a number of frames or in terms of time of the underlying video. Frame 335 may comprise an example frame in first video stream 115 during first non-operational time period 330.

Once fingerprint applier 105 refrains from providing fingerprint 305 on the second contiguous plurality of frames in first video stream 115 in stage 220, method 200 may continue to stage 230 where fingerprint applier 105 may provide fingerprint 305 on a third contiguous plurality of frames in first video stream 115. The third contiguous plurality frames may be contiguous with the second contiguous plurality frames.

Fingerprint 305, for example, may be overlaid onto a set of frames (e.g., the third contiguous plurality of frames) in the video based content (e.g., first video stream 115). Frame 345 may comprise an example frame in the third contiguous plurality of frames. In other words, fingerprint 305 may be overlaid on the third contiguous plurality of frames in first video stream 115. This period (e.g., the third contiguous plurality of frames) of applying fingerprint 305 may comprise a second fingerprint time period 340 and may be defined, for example, in terms of a number of frames (e.g., 12 frames) or in terms of time (e.g., 0.5 seconds of the underlying video). Once fingerprint applier 105 provides fingerprint 305 on the third contiguous plurality of frames in first video stream 115 in stage 230, method 200 may then end at stage 240.

The aforementioned stages of method 300 may be repeated up to the full length of first video stream 115. For example, fingerprint applier 105 may refrain from providing fingerprint 305 on a fourth contiguous plurality of frames in first video stream 115. The period (e.g., the fourth contiguous plurality of frames) of not applying the fingerprint may comprise a second non-operational time period 350 and may be defined, for example, in terms of a number of frames or in terms of time of the underlying video. Frame 355 may comprise an example frame in first video stream 115 during second non-operational time period 350.

In addition, fingerprint 305, for example, may be overlaid by fingerprint applier 105 onto another set of frames (e.g., a fifth contiguous plurality of frames) in the video based content (e.g., first video stream 115). Frame 360 may comprise an example frame in the fifth contiguous plurality of frames. In other words, fingerprint 305 may be overlaid on the fifth contiguous plurality of frames in first video stream 115. This period (e.g., the fifth contiguous plurality of frames) of applying fingerprint 305 may comprise a third fingerprint time period 365 and may be defined, for example, in terms of a number of frames (e.g., 12 frames) or in terms of time (e.g., 0.5 seconds of the underlying video).

Consistent with embodiments of the disclosure, first fingerprint time period 315, second fingerprint time period 340, and third fingerprint time period 365 may be equal. Moreover, first non-operational time period 330 and second non-operational time period 350 may be equal. The length of the fingerprint time period (e.g., first fingerprint time period 315, second fingerprint time period 340, and third fingerprint time period 365) may be chosen to make fingerprint 305 unnoticeable by the user viewing the video content on display 110. In other words, the fingerprint time period may be so short that the user may not notice fingerprint 305 when viewing the video content on display 110.

Figure 4:
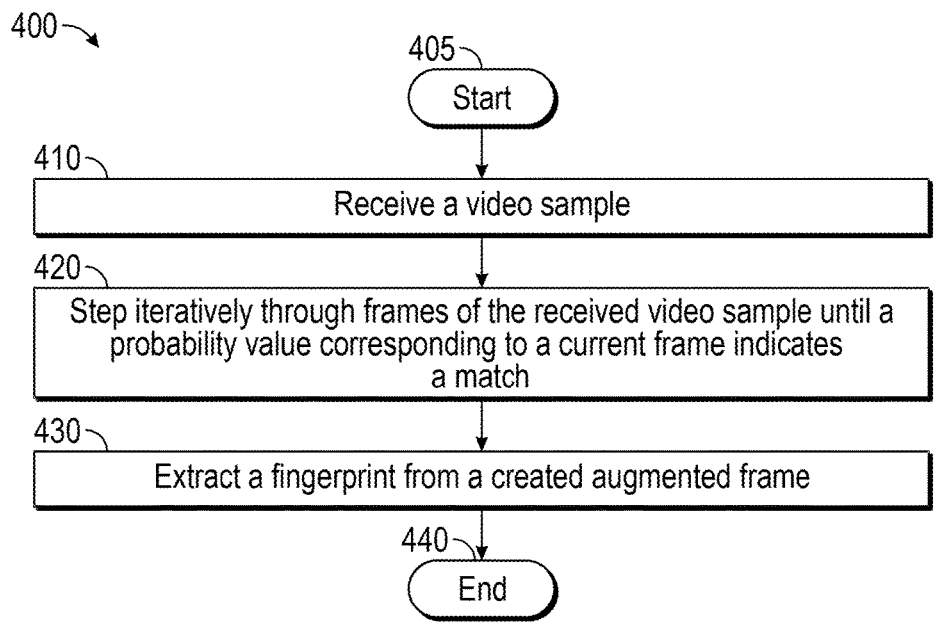
FIG. 4 is a flow chart of a method for detecting a multi-blend fingerprint.

FIG. 4 is a flow chart setting forth the general stages involved in a method 400 consistent with an embodiment of the disclosure for detecting a multi-blend fingerprint. Method 400 may be implemented using fingerprint detector 130 as described in more detail above with respect to FIG. 1B. Ways to implement the stages of method 400 will be described in greater detail below.

Method 400 may begin at starting block 405 and proceed to stage 410 where fingerprint detector 130 may receive video sample 135. For example, a pirate may perpetrate a security breach by re-broadcasting video based content to one or more non-paying or un-authorized consumers. This re-broadcasting may be performed over the internet via social media or other sites. The underlying video based content that the pirate may be re-broadcasting may be fingerprinted, for example, by the process described above with respect to FIG. 2. Received video sample 135 may comprise the pirated, re-broadcasted video that may have been fingerprinted by the process described above with respect to FIG. 2. The start-time, frame-rate, and duration of video sample 135 may be different from second video stream 120. Consistent with embodiments of the disclosure, multiple periodic presentations of the fingerprint may be applied (e.g., method 200 of FIG. 2) and then a detecting process (e.g., method 400 of FIG. 4) may augment (e.g., blend) together the multiple periodic presentations to decode the fingerprint.

From stage 410, where fingerprint detector 130 receives video sample 135, method 400 may advance to stage 420 where fingerprint detector 130 may step iteratively through frames of received video sample 135 until a probability value corresponding to a current frame indicates a match. Consistent with embodiments of the disclosure, deciding that the probability value indicates the match may comprise, for example, creating an augmented frame, determining the probability value corresponding to the created augmented frame, and determining that the probability value indicates the match.

Because video sample 135 may not be aligned with the start of the pirated video content (e.g., second video stream 120), fingerprint detector 130 may not know where the first fingerprinted frame in video sample 135 is located (i.e., fingerprint detector 130 may not know the length of offset 320). Accordingly, embodiments of the disclosure may apply an iterative process to discover where in video sample 135 the first fingerprinted frame is located. In other words, fingerprint detector 130 may know: i) the fingerprint time period; and ii) that first fingerprint time period 315, second fingerprint time period 340, and third fingerprint time period 365 may be equal to this known fingerprint time period. In addition, fingerprint detector 130 may know: i) the non-operational time period; and ii) that first non-operational time period 330 and second non-operational time period 350 may be equal to this known non-operational time period.

In order for fingerprint detector 130 to discover the length of offset 320, fingerprint detector 130 may initially assume the first frame of video sample 135 coincides with the first frame of first fingerprint time period 315 and may then determine an augmented (e.g., blended) frame and probability (e.g., confidence) value as described below. The probability, for example, may be obtained from an accumulator matrix in a Hough Transform as described below. Fingerprint detector 130 may then repeat (e.g., iterate) this process for the next (e.g., second) frame and again for subsequent frames in video sample 135. The result may be a sequence of probability (e.g., confidence) values whose maxima correspond with the center of the fingerprint time period and whose pixel attributes are most likely to be the fingerprint. This may be extended to repeating every other frame (or third frame, etc.) instead of every frame to increase performance at the cost of detection accuracy. Fingerprint detector 130 may step iteratively through frames of received video sample 135 until a probability value corresponding to a current frame indicates a match. A matched probability value may comprise, for example: i) a probability value higher than a threshold; or ii) the maximum value of a sequence of rising probability values, followed by a sequence of probability values over the threshold, followed by a falling probability value (i.e., the probability value right before the fall).

As described above, determining the augmented frame for a current frame in the iterative process may comprise blending a first plurality of frames (in video sample 135) starting from and including the current frame with a second plurality of frames (in video sample 135) starting from and including a subsequent frame. An end of the first plurality of frames and a beginning of the second plurality of frames may be separated by the non-operational time period in video sample 135. The first plurality of frames may comprise the fingerprint time period and the second plurality of frames may also comprise the fingerprint time period. For example, the fingerprint time period may comprise 1 second and the non-operational time period may comprise 59 seconds. In this example, the augmented or blended frame may comprise a blend of the frames: i) within a second of the current frame inclusively; and ii) within a second of and including a frame 59 seconds from the end of the first plurality of frames. Accordingly, the augmented or blended frame may comprise a blend of 2 seconds worth of frames in video sample 135. While this example shows blending two sets of a plurality of frames, any number of sets of a plurality of frames may be blended and embodiments of the disclosure are not limited to blending two sets of a plurality of frames.

The detectability of fingerprint 305 may depend on the underlying video onto which fingerprint 305 is placed. For example, portions of the underlying video may not provide enough contrast between the underlying video and fingerprint 305 to make all or portions of fingerprint 305 distinguishable from the underlying video in a given frame.

Consequently, blending multiple frames from different portions of the underlying video content of video sample 135 may create some diversity in the background onto which fingerprint 305 was placed. This diversity may aid in distinguishing fingerprint 305 from the underlying video.

To decode the fingerprint, fingerprint detector 130 may augment or blend frames from the fingerprint time (i.e., FPk) periods. This may be done to soften edges present in the video prior to edge detection. Without blending, there may be many more edges present that may lead to false positive detection of the fingerprint. Fingerprint detector 130 may then use an edge detection process followed by a process that may detect shapes, for example, a Hough Transform. The augmentation may comprise a process that acts on frames equally that has the effect of sharpening the shapes within the fingerprint and softening transient lines present in the video. For example, a statistical mean may be used.

Once fingerprint detector 130 steps iteratively through frames of received video sample 135 in stage 420, method 400 may continue to stage 430 where fingerprint detector 130 may extract fingerprint 305 from the created augmented frame. Once fingerprint detector 130 extracts fingerprint 305 from the created augmented frame in stage 430, method 400 may then end at stage 440.

Consistent with embodiments of the disclosure, the fingerprint time periods and the non-operational time periods may not be constant. Instead, fingerprint applier 105 may chose these values probabilistically. Consequently, fingerprint detector 130 may use those probability values to assist with detection. For example, a process may be used where fingerprint applier 105 may be given a fixed value for the fingerprint time period, but choses the non-operational time period as either a first time (e.g., 8 minutes) or a second time (e.g., 5 minutes) with a first probability (e.g., 0.75) and a second probability (e.g., 0.25), respectively. Having the higher probability, fingerprint detector 130 may modify its process and may first assume the non-operational time period as first time (e.g., 8 minutes). If that does not increase the probability values as described above, having the lower probability, fingerprint detector 130 may then try the non-operational time period as the second time (e.g., 5 minutes). Accordingly, embodiments of the disclosure may consider two or more successive blends and their resulting probability values before deciding what is the correct non-operational time period. Moreover, the fingerprint time periods and the non-operational time periods may be set based on content type (e.g., sports content, movie content, news content, etc.).

Varying the fingerprint time periods and the non-operational time periods may increase the security of the process at the cost of time/complexity within fingerprint detector 130. The above assumes fingerprint detector 130 may not have access to the original video. If fingerprint detector 130 is able to use, for example, perceptual hashing in order to determine content attributes such as broadcast time and channel of the original video, the fingerprint time periods and the non-operational time periods may both be decided as a function of those attributes by fingerprint detector 130.

Figure 5:
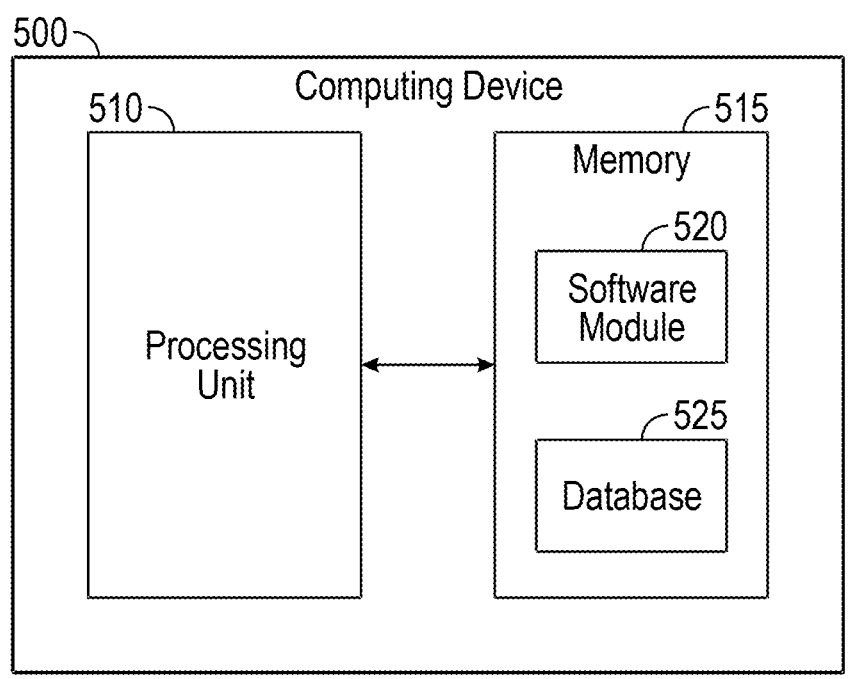
FIG. 5 is a block diagram of a computing device.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform processes for providing multi-blend fingerprinting or processes for detecting a multi-blend fingerprint, including for example, any one or more of the stages from method 200 described above with respect to FIG. 2 and any one or more of the stages from method 400 described above with respect to FIG. 4. Computing device 500, for example, may provide an operating environment for fingerprint applier 105 and fingerprint detector 130. Fingerprint applier 105 and fingerprint detector 130 may operate in other environments and are not limited to computing device 500.

Computing device 500 may be implemented using a personal computer, a network computer, a mainframe, a router, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1A and FIG. 1B may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
receiving a video sample;
stepping iteratively through frames of the received video sample until a probability value corresponding to a current frame indicates a match, wherein frames in the video sample are skipped during the iterative stepping, and wherein deciding that the probability value indicates the match comprises:
creating an augmented frame,
determining the probability value corresponding to the created augmented frame, and
determining that the probability value indicates the match, wherein determining that the probability value indicates the match comprises determining that the probability value is a maximum of a sequence of rising probability values, followed by a sequence of probability values over a predetermined value, followed by a falling probability value;
extracting a fingerprint from the created augmented frame; and
identifying a subscriber associated with the fingerprint, wherein the fingerprint is unique to a fingerprint applier which is unique to the subscriber.

2. The method of claim 1, wherein stepping iteratively through the frames of the received video sample comprises stepping iteratively through the frames of the received video sample, and wherein the frames of the received video sample that are stepped through are contiguous.

3. The method of claim 1, wherein creating the augmented frame comprises blending a first plurality of frames starting from and including the current frame with a second plurality of frames starting from and including a subsequent frame in the video sample, an end of the first plurality of frames and a beginning of the second plurality of frames being separated by a non-operational time period in the video sample, the first plurality of frames corresponding to a fingerprint time period and the second plurality of frames corresponding to the fingerprint time period.

4. The method of claim 1, wherein extracting the fingerprint from the created augmented frame comprises:
detecting edges in the created augmented frame; and
detecting shapes based on the detected edges.

5. The method of claim 1, wherein extracting the fingerprint comprises extracting the fingerprint comprising a constellation configured to identify a subscriber of a video service.

6. A non-transitory computer readable medium that stores a set of instructions which when executed perform a method comprising:
receiving a video sample;
stepping iteratively through frames of the received video sample until a probability value corresponding to a current frame indicates a match, wherein deciding that the probability value indicates the match comprises:
creating an augmented frame, wherein creating the augmented frame comprises blending a first plurality of frames starting from and including the current frame with a second plurality of frames starting from and including a subsequent frame in the video sample, an end of the first plurality of frames and a beginning of the second plurality of frames being separated by a non-operational time period in the video sample, the first plurality of frames corresponding to a fingerprint time period and the second plurality of frames corresponding to the fingerprint time period,
determining the probability value corresponding to the created augmented frame, and
determining that the probability value indicates the match;
extracting a fingerprint from the created augmented frame; and
identifying a subscriber associated with the fingerprint, wherein the fingerprint is unique to a fingerprint applier which is unique to the subscriber.

7. The non-transitory computer readable medium of claim 6, wherein frames in the video sample are skipped during the iterative stepping.

8. The non-transitory computer readable medium of claim 6, wherein determining that the probability value indicates the match comprises determining that the probability value is greater than a predetermined value.

9. The non-transitory computer readable medium of claim 6, wherein extracting the fingerprint from the created augmented frame comprises:
   detecting edges in the created augmented frame; and
   detecting shapes based on the detected edges.

10. The non-transitory computer readable medium of claim 6, wherein extracting the fingerprint comprises extracting the fingerprint comprising a constellation configured to identify a subscriber of a video service.

11. The non-transitory computer readable medium of claim 6, wherein determining that the probability value indicates the match comprises determining that the probability value is a maximum of a sequence of rising probability values, followed by a sequence of probability values over a predetermined value, followed by a falling probability value.

12. An apparatus comprising:
   a memory storage; and
   a processing unit coupled to the memory storage, wherein the processing unit is operative to:
      receive a video sample;
      step iteratively through frames of the received video sample until a probability value corresponding to a current frame indicates a match, wherein deciding that the probability value indicates the match comprises the processing unit being operative to:
         create an augmented frame, wherein creating the augmented frame comprises blending a first plurality of frames starting from and including the current frame with a second plurality of frames starting from and including a subsequent frame in the video sample, an end of the first plurality of frames and a beginning of the second plurality of frames being separated by a non-operational time period in the video sample, the first plurality of frames corresponding to a fingerprint time period and the second plurality of frames corresponding to the fingerprint time period,
         determine the probability value corresponding to the created augmented frame, and
         determine that the probability value indicates the match;
      extracting a fingerprint from the created augmented frame; and
      identify a subscriber associated with the fingerprint, wherein the fingerprint is unique to a fingerprint applier which is unique to the subscriber.

13. The apparatus of claim 12, wherein frames in the video sample are skipped during the iterative stepping.

14. The apparatus of claim 12, wherein the processing unit being operative to determine that the probability value indicates the match comprises the processing unit being operative to determine that the probability value is greater than a predetermined value.

15. The apparatus of claim 12, wherein the processing unit being operative to extract the fingerprint from the created augmented frame comprises the processing unit being operative to:
   detect edges in the created augmented frame; and
   detect shapes based on the detected edges.

16. The apparatus of claim 12, wherein the processing unit being operative to extract the fingerprint comprises the processing unit being operative to extract the fingerprint comprising a constellation configured to identify a subscriber of a video service.

17. The apparatus of claim 12, wherein the processing unit being operative to determine that the probability value indicates the match comprises the processing unit being operative to determine that the probability value is a maximum of a sequence of rising probability values, followed by a sequence of probability values over a predetermined value, followed by a falling probability value.

* * * * *